United States Patent [19]

Welsch

[11] 4,007,771
[45] Feb. 15, 1977

[54] PROCESS FOR THE PRODUCTION OF ALUMINUM

[76] Inventor: Matthias Welsch, Dammstr. 1, 415 Krefeld-Uerdingen, Germany

[22] Filed: Jan. 13, 1975

[21] Appl. No.: 540,189

[30] Foreign Application Priority Data

Jan. 15, 1974 Germany .................... 2401654

[52] U.S. Cl. .................. 164/56; 164/114; 164/118; 164/124; 164/125; 164/122; 164/266; 75/135

[51] Int. Cl.² .................. B22D 13/00; B22D 27/04

[58] Field of Search .......... 164/118, 122, 123, 124, 164/125, 126, 127, 128, 266, 114, 56, 57, 58; 75/135, 68 R

[56] References Cited

UNITED STATES PATENTS

| 2,178,163 | 10/1939 | Davidson | 164/118 |
| 2,248,693 | 7/1941 | Bortscherer | 164/118 |
| 3,249,425 | 5/1966 | Aamot | 164/124 X |
| 3,672,429 | 6/1972 | Lajoye | 164/118 X |

Primary Examiner—Ronald J. Shore

[57] ABSTRACT

Aluminum is produced from low-grade aluminum alloys by melting an Al-X alloy wherein X has a higher specific weight than aluminum and forms an eutectic mixture rich in aluminum, the starting melt being on the side of the eutectic mixture rich in aluminum, and radially cooling the melt from the inside to the outside while under the effect of centrifugal force.

5 Claims, 3 Drawing Figures

1  1a  2  2a  3  6

PROCESS FOR THE PRODUCTION OF ALUMINUM

The invention relates to processes for the production of aluminum by using the refining of aluminum alloys by centrifuging when controlled cooling is effected and to a device for implementing the process.

DISCUSSION OF THE PRIOR ART

Processes for refining aluminum alloys by centrifuging belong to the prior art (magazine "Aluminium" vol. 48 1972, pages 372–376). This known process relates to the enrichment of aluminum-silicon alloys, from a partly solidified melt a liquid phase rich in aluminum being seperated by centrifuging from an already solidified phase rich in silicon. At its outer periphery the centrifuge has a drum wall to be removed from the centrifuging process. Before the centrifuging process the formation of a cohesive skeleton of primary crystals is necessary.

Proceeding from the known principle of the centrifuging process, the invention has set the object of developing a process and a device for the production of aluminum more especially pure aluminium. The starting materials for this production of aluminum are available low-grade aluminum alloys.

SUMMARY OF THE INVENTION

The object of invention is accomplished by selecting an Al-X alloy, the X component of which has a higher specific weight than aluminum and forms an eutectic mixture with aluminum and whereby the composition of said chosen alloy is on the aluminum rich part of the eutectic mixture, and, after by cooling this alloy has been melted and centrifuged, this liquid alloy from the inside to the outside while under the effect of the centrifugal force. The X component can be an element with a higher specific weight or, however, a compound which does not have the desired higher specific weight that the liquid aluminum melt until after the reaction with an available or additional third element. Therefore in the aluminum melt it is advantageous to precipitate contaminating elements such as iron and silicon by the addition of third elements. In order to remove iron it has proved expedient to add zinc, whereby solid complex compounds result which have a higher specific weight than the liquid aluminum melt. To remove silicon, lead can be added, which washes out at least a part of the undesired silicon.

In order to provide the desired temperature gradients the centrifuged melt is insulated largely against loss of heat to the outside and a cooling medium is blown onto the surface of the melt lying on the inside. Air is preferably used as a cooling medium. To insulate against loss of heat to the outside it is preferred to provide a steel mold with known insulating material such as kaolin and to heat the mold before casting to about the melting temperature of the alloy. Preferably the heating is stopped immediately after casting.

The process according to the invention is preferably used on aluminum-copper alloys having a copper content of less than 5%.

Good results were attained when using the process for aluminum alloys of the type Al—Zn—Mg.

A preferred device for implementing the process according to the invention has a cooling device coaxially in a drumshaped centrifuge mold which is insulated to prevent loss of heat to the outside. The cooling device preferably consists of a cylinder extending over the length of the centrifugal drum, which has outlet apertures directed radially outwards. To insulate against heat loss the mold (consisting of heat-resistant steel and provided on the inner surface with a kaolin layer) is heated by electrical resistance heating or blowing hot gas through a double-walled drum casing. Heating from the outer side is stopped when starting cooling from the inner side.

In the preferred exemplified embodiment on the inner jacket of the heat-insulated centrifuge are arranged wedge-shaped elements spaced from one another and running in the axial direction and directed radially inwards. These wedge-shaped elements can be heated corresponding to the drums. The elements prevent a piping of the solidifying aluminum. The wedge-shaped elements are insulated, preferably heated, analogous to the above mentioned mold so as to effect a lateral heat insulation. Heating is stopped again after casting.

BRIEF DESCRIPTION OF DRAWINGS

The invention is described in more detail as follows by means of an exemplified embodiment. it shows FIG. 1 a longitudinal section through the device according to the invention, FIG. 2 the cooling conditions shown schematically in cross section and FIG. 3 a cross section of FIG. 1 in a modified exemplified embodiment.

The device shown in FIGS. 1 to 3 for carrying out the inventive process consists of a drum-shaped centrifuge 1, the outer jacket and front surfaces of which consist of steel and a heat-insulating material such as kaolin. Kieselguhr bricks can also be used as an insulating layer. The drum-shaped centrifuge 1 made of heat-resistant steel can be heated by electrical resistance heating. The insulated inner surface of the cylinder 1 is designated by 1a. In the centrifuge 1 is the cooling device 3 running in the axial direction. This cooling device 3 consists of a long cylinder which has outlet apertures 6 directed outwards. The cooling conditions are schematically represented in FIG. 2. Compressed air can be used as a cooling medium.

The melt in the centrifuge is designated by 2.

DESCRIPTION OF PREFERRED EMBODIMENT

In a preferred exemplified embodiment in the centrifuge 1 are wedge-shaped elements 4 running in the axial direction which on the one hand prevent a piping and on the other hand result directly in rollable aluminum ingots 5. The wedge-shaped elements consist of heat-insulated steel. A kaolin layer can again be used for the heat insulation. The wedge-shaped elements are preferably heated analogous to the centrifuge 1 for lateral heat insulation.

The process according to the invention is to be described especially by means of an aluminum-copper alloy. Copper has a higher specific weight than aluminum and at 54° C forms an eutectic mixture with aluminum. This eutectic mixture contains 33% by weight copper and 96% by weight aluminum. From this starting alloy pure aluminium is to be produced when controlled cooling is effected by centrifuging. Moreover a by-product is the alloy having a eutectic composition.

The particular advantage of this teaching consists in that high-grade aluminum can be produced from a low-grade alloy by a simple mechanical separation process.

EXAMPLE

Figure 1:
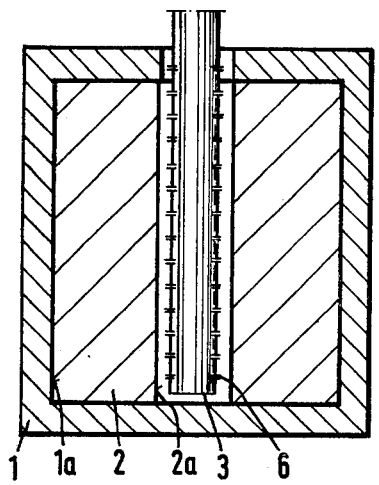
Figure 2:
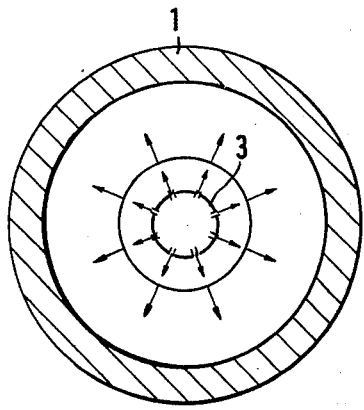
Figure 3:
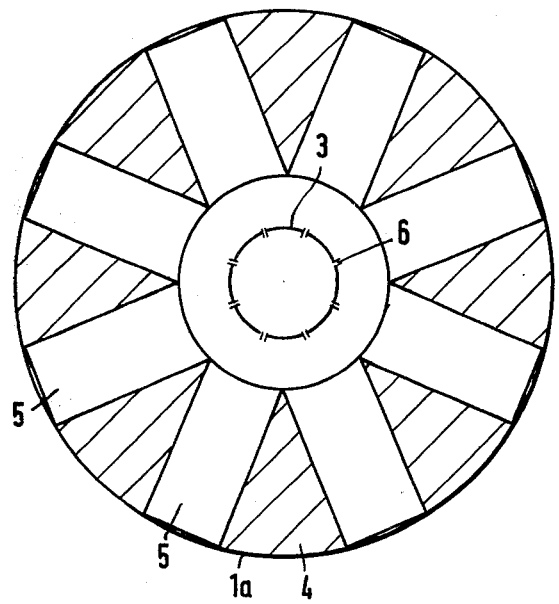

In a device constructed according to FIG. 3 in which six rectangular ingots weighing 20 kg each can be simultaneously produced altogether 120 kg metal melt is cast. The individual ingots measured 400 mm high, 100 mm wide and 200 mm deep. The drums 1 and the wedge-shaped elements consisted of heat resistant steel which was insulated ceramically on the inner surface with kaolin. Before casting the melt the drums 1 and the segments 4 were heated by means of electrical resistance heating to a temperature of 700° C. The melt was poured at a temperature of 730° C into the drum. The following alloys were cast:

|   | % Al | % Cu | % Zn | % Mg |
|---|------|------|------|------|
| 1) | 96 | 4 | — | — |
| 2) | 95 | 5 | — | — |
| 3) | 93 | 7 | — | — |
| 4) | 94 | — | 4 | 2 |

These charges were cooled once with a quantity of cooled air of 2,000 l/min and once with a quantity of 4,000 l/min radially from the inside to the outside. In the first case the setting time was 30 minutes and in the second case where cooling was stronger 20 minutes.

The heating of drum and segments was discontinued at the beginning of cooling. Varying the cooling rate did not lead to different results. The results were as follows:

Alloy (1) to (3): in the very brittle outer edge zone solidified an alloy which contained 32.5 to 33% copper. This alloy could be easily removed by hitting with a hammer. With alloy (3) this zone was much thicker than in alloys (1) and (2). The alloy remaining in the interior has a copper content of 0.03 to 0.05%. No transfer zone resulted.

With the zinc and magnesium containing alloy (4) the alloy contained roughly 50% Al, 33% Zn and 17% Mg. The alloy remaining inside had a content of 0.02 to 0.03% Zn and 0.02 to 0.03% Mg. The remaining melt solidifying outside had to be removed by metal-cutting treatment (chipping)

What is claimed is:

1. A method for the production of aluminum by refining an aluminum alloy by centrifuging with controlled cooling which comprises melting an Al-X alloy, wherein the X-component of said alloy has a higher specific weight than aluminum and forms an eutectic mixture with aluminum whereby the composition of the starting melt is on that side of the eutectic mixture rich in aluminum, and radially cooling said melt from the inside to the outside by blowing a cooling medium onto the inner surface of said melt while being under the effect of the centrifugal force.

2. The method of claim 1 wherein contaminating elements present in the aluminum melt are removed by the addition of third elements.

3. The method of claim 1 wherein the alloy is an aluminum-copper alloy having a copper content of less that 10%.

4. The method of claim 2 wherein said contaminating elements are selected from the group consisting of iron and silicon.

5. The method of claim 3 wherein said copper content is less than 5%.

* * * * *